United States Patent
Collette et al.

(10) Patent No.: US 9,646,453 B2
(45) Date of Patent: May 9, 2017

(54) INTEGRATING THREE-DIMENSIONAL AND TWO-DIMENSIONAL GAMING ELEMENTS

(71) Applicant: Bally Gaming, Inc., Las Vegas, NV (US)

(72) Inventors: Shawn C. Collette, Henderson, NV (US); David E. Detlefsen, Northfield, IL (US); Joel R. Jaffe, Glenview, IL (US); Sean P. Kelly, Chicago, IL (US); Timothy C. Loose, Chicago, IL (US); Scott A. Massing, Lincolnwood, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 1017 days.

(21) Appl. No.: 13/722,468

(22) Filed: Dec. 20, 2012

(65) Prior Publication Data

US 2013/0165205 A1   Jun. 27, 2013

Related U.S. Application Data

(60) Provisional application No. 61/580,068, filed on Dec. 23, 2011.

(51) Int. Cl.
*A63F 13/00* (2014.01)
*G07F 17/32* (2006.01)
(Continued)

(52) U.S. Cl.
CPC ......... *G07F 17/3213* (2013.01); *A63F 13/00* (2013.01); *A63F 13/52* (2014.09);
(Continued)

(58) Field of Classification Search
CPC ............... G02B 27/225; G02B 27/2214
(Continued)

(56) References Cited

U.S. PATENT DOCUMENTS

| | | | |
|---|---|---|---|
| 6,089,977 | A | 7/2000 | Bennett |
| 6,887,157 | B2 | 5/2005 | Lemay et al. |

(Continued)

FOREIGN PATENT DOCUMENTS

| | | |
|---|---|---|
| EP | 0727245 | 5/2000 |
| EP | 2082381 | 7/2009 |

(Continued)

OTHER PUBLICATIONS

Co-Pending U.S. Appl. No. 14/977,223, filed Dec. 21, 2015, 48 pages.

(Continued)

*Primary Examiner* — David L Lewis
*Assistant Examiner* — Robert Mosser
(74) *Attorney, Agent, or Firm* — DeLizio Law, PLLC

(57) ABSTRACT

A wagering game system and its operations are described herein. In some embodiments, the operations include detecting a request to present a wagering game object via a display device capable of stereoscopic, three-dimensional visual effects. In some embodiments, the wagering game object is one of a plurality of wagering game objects. In some embodiments, the operations further include determining a virtual three-dimensional depth value based on one a degree of significance assigned to the wagering game object. The operations can further include presenting the wagering game object via the display device with a degree of three-dimensional stereoscopic depth effect that corresponds to the virtual three-dimensional depth value.

26 Claims, 10 Drawing Sheets

(51) Int. Cl.
*A63F 13/52* (2014.01)
*G02B 27/22* (2006.01)
*G07F 17/34* (2006.01)

(52) U.S. Cl.
CPC ........ *G02B 27/225* (2013.01); *G07F 17/3211* (2013.01); *G07F 17/3244* (2013.01); *G07F 17/34* (2013.01); *A63F 2250/307* (2013.01)

(58) Field of Classification Search
USPC .................................................... 463/32, 33
See application file for complete search history.

(56) References Cited

U.S. PATENT DOCUMENTS

| | | | |
|---|---|---|---|
| 6,908,381 | B2 | 6/2005 | Ellis |
| 7,128,647 | B2 | 10/2006 | Muir |
| 7,311,607 | B2 | 12/2007 | Tedsen et al. |
| 7,367,885 | B2 | 5/2008 | Escalera et al. |
| 7,841,944 | B2 | 11/2010 | Wells |
| 7,857,700 | B2 * | 12/2010 | Wilder ............... G02B 27/2214 345/419 |
| 7,874,900 | B2 | 1/2011 | Ward et al. |
| 7,878,910 | B2 | 2/2011 | Wells |
| 7,909,696 | B2 | 3/2011 | Beaulieu et al. |
| 7,918,730 | B2 | 4/2011 | Brosnan et al. |
| 7,951,001 | B2 | 5/2011 | Wells |
| 8,002,623 | B2 | 8/2011 | Resnick et al. |
| 8,029,350 | B2 | 10/2011 | Pacey |
| 8,077,195 | B2 | 12/2011 | Grobmann |
| 8,096,878 | B2 | 1/2012 | Durham et al. |
| 8,118,674 | B2 | 2/2012 | Burak et al. |
| 8,182,339 | B2 | 5/2012 | Anderson et al. |
| 8,210,922 | B2 | 7/2012 | Williams et al. |
| 8,267,767 | B2 | 9/2012 | Kryuchkov et al. |
| 8,384,710 | B2 | 2/2013 | Schlottmann et al. |
| 8,454,428 | B2 | 6/2013 | Pacey et al. |
| 8,628,399 | B2 | 1/2014 | Aoki et al. |
| 8,628,415 | B2 | 1/2014 | Johnson et al. |
| 8,690,671 | B2 | 4/2014 | Kaufman |
| 8,715,055 | B2 | 5/2014 | Dixon |
| 8,721,427 | B2 | 5/2014 | Kelly et al. |
| 8,784,206 | B1 | 7/2014 | Gronkowski et al. |
| 8,968,092 | B2 | 3/2015 | Gomez et al. |
| 8,979,634 | B2 | 3/2015 | Pacey et al. |
| 9,007,367 | B2 | 4/2015 | Aponte et al. |
| 9,128,293 | B2 | 9/2015 | Ohta |
| 9,168,454 | B2 | 10/2015 | Manning et al. |
| 2004/0077401 | A1 | 4/2004 | Schlottmann |
| 2004/0077404 | A1 | 4/2004 | Schlottmann et al. |
| 2004/0192430 | A1 | 9/2004 | Burak et al. |
| 2005/0037843 | A1 | 2/2005 | Wells et al. |
| 2005/0288092 | A1 | 12/2005 | Ellis |
| 2006/0148553 | A1 | 7/2006 | Dodge |
| 2007/0041095 | A1 | 2/2007 | Nakaya et al. |
| 2007/0117626 | A1 | 5/2007 | Castellari |
| 2007/0281780 | A1 | 12/2007 | Aida |
| 2008/0108413 | A1* | 5/2008 | Gelber .................... G07F 17/34 463/20 |
| 2008/0113745 | A1 | 5/2008 | Williams et al. |
| 2008/0194320 | A1 | 8/2008 | Walsh et al. |
| 2008/0220850 | A1 | 9/2008 | Pacey |
| 2009/0181755 | A1 | 7/2009 | Gagner et al. |
| 2009/0181769 | A1 | 7/2009 | Thomas et al. |
| 2009/0291731 | A1 | 11/2009 | Jaffe et al. |
| 2009/0298568 | A1 | 12/2009 | Pacey et al. |
| 2010/0234094 | A1 | 9/2010 | Gagner et al. |
| 2010/0279755 | A1 | 11/2010 | Pacey et al. |
| 2011/0045891 | A1 | 2/2011 | Ansari |
| 2011/0115880 | A1* | 5/2011 | Yoo .................... H04N 13/0022 348/42 |
| 2011/0201404 | A1 | 8/2011 | Wells |
| 2011/0256921 | A1 | 10/2011 | Pacey et al. |
| 2012/0172119 | A1 | 7/2012 | Kelly et al. |
| 2013/0184064 | A1 | 7/2013 | Manning et al. |
| 2013/0267317 | A1 | 10/2013 | Aoki et al. |
| 2013/0331184 | A1 | 12/2013 | Kelly et al. |
| 2014/0066178 | A1 | 3/2014 | Kelly |
| 2014/0073386 | A1 | 3/2014 | Aoki et al. |
| 2014/0121015 | A1 | 5/2014 | Massing et al. |
| 2014/0235342 | A1 | 8/2014 | Kelly et al. |
| 2014/0235343 | A1 | 8/2014 | Kelly et al. |
| 2014/0235344 | A1 | 8/2014 | Kelly et al. |
| 2014/0235345 | A1 | 8/2014 | Kelly et al. |
| 2014/0295970 | A1 | 10/2014 | Gronkowski et al. |
| 2015/0024846 | A1 | 1/2015 | Gomez et al. |
| 2015/0213675 | A1 | 7/2015 | Aponte et al. |
| 2016/0042589 | A1 | 2/2016 | Manning et al. |
| 2016/0110948 | A1 | 4/2016 | Collette et al. |
| 2016/0110949 | A1 | 4/2016 | Collette et al. |
| 2016/0110950 | A1 | 4/2016 | Collette et al. |

FOREIGN PATENT DOCUMENTS

| | | |
|---|---|---|
| WO | 2006039257 | 4/2006 |
| WO | 2006039324 | 4/2006 |
| WO | 2006039348 | 4/2006 |
| WO | 2006039371 | 4/2006 |
| WO | 2007021559 | 2/2007 |
| WO | 2007021560 | 2/2007 |
| WO | 2007032878 | 3/2007 |
| WO | WO-2008079542 | 7/2008 |
| WO | WO-2012056636 | 3/2012 |
| WO | 2012065146 | 5/2012 |

OTHER PUBLICATIONS

Co-Pending U.S. Appl. No. 14/977,233, filed Dec. 21, 2015, 50 pages.
Co-Pending U.S. Appl. No. 14/977,245, filed Dec. 21, 2015, 49 pages.
"PCT Application No. PCT/US11/60497 International Preliminary Report on Patentability", Jan. 11, 2013, 4 pages.
"PCT Application No. PCT/US11/60497 International Search Report", May 25, 2012, 9 pages.
"U.S. Appl. No. 13/822,621 Office Action", Jan. 22, 2015, 7 Pages.
"U.S. Appl. No. 14/920,434 Office Action", Jun. 13, 2016, 11 pages.
"U.S. Appl. No. 14/977,223 Office Action", Jul. 5, 2016, 20 pages.
"U.S. Appl. No. 14/977,245 Office Action", Jul. 1, 2016, 17 pages.
Co-Pending U.S. Appl. No. 14/920,434, filed Oct. 22, 2015, 51 pages.
"U.S. Appl. No. 14/977,233 Office Action", Jul. 29, 2016, 19 pages.
"U.S. Appl. No. 14/977,233 Final Office Action", Feb. 10, 2017, 26 pages.
"U.S. Appl. No. 14/262,425 Final Office Action", Mar. 10, 2017, 22 pages.
"U.S. Appl. No. 14/262,444 Final Office Action", Mar. 9, 2017, 24 pages.

* cited by examiner

INTEGRATING THREE-DIMENSIONAL AND TWO-DIMENSIONAL GAMING ELEMENTS

RELATED APPLICATIONS

This application claims the priority benefit of U.S. Provisional Application Ser. No. 61/580,068 filed Dec. 23, 2011.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

TECHNICAL FIELD

Embodiments of the inventive subject matter relate generally to wagering game systems and networks that, more particularly, present three-dimensional stereoscopic graphical content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

One way to add visual appeal to wagering games is to present wagering game content using stereoscopic three-dimensional graphics. Stereoscopic three-dimensional graphics appear to have depth, so graphical objects appear to hover in space, in front of display monitors. Although stereoscopic three-dimensional (3D) graphics may be visually appealing, presenting stereoscopic 3D graphics may require vast processing power and other computing resources. Further, presenting all gaming graphics in 3D can overstimulate some players' vision or can disorient some viewers who are not used to viewing images on a 3D display.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operations performed by some embodiments. The third section describes additional example embodiments while the fourth section describes example operating environments. The fifth section presents some general comments.

Introduction

This section provides an introduction to some embodiments.

As stated previously, wagering game companies are interested in creating and providing innovate wagering games and gaming features to the demanding public. Three-dimensional (3D) presentation technologies have captivated the interest of the entertainment industry for years. The gaming industry can also benefit from 3D presentation technologies in innovative ways.

Some embodiments of the inventive subject matter present a first portion of wagering game content using two-dimensional (2D) presentation techniques while concurrently presenting second portions of the wagering game content using 3D presentation techniques. The second portions are presented with binocular, stereoscopic depth which may also be referred to herein as a "3D effect" or simply as "3D." Some embodiments include presenting multiple separated regions of 3D content concurrently with 2D content, such as multiple, separate 3D slot reels presented on a 2D background. Some embodiments include presenting the appearance of interactions between 2D and 3D regions, such as movement of 3D objects in front of, or behind, 2D objects. Some embodiments include presenting transitions of some regions between 2D and 3D modes, and/or vice versa, to highlight an object. Some embodiments include presenting gaming objects with varying degrees of 3D (stereoscopic) depth that correspond to various conditions or factors, such as modifying 3D depth based on significance values of the gaming elements as indicated in a pay table. Many other embodiments are also described.

The following description will describe how some embodiments concurrently present 3D and 2D gaming content. It should be noted that although some embodiments may emphasize presenting a region of 3D content in front of a 2D background/object to highlight the 3D content, it is noted that other embodiments can utilize similar techniques to emphasize a region of 2D content against a 3D background/object.

Figure 1:
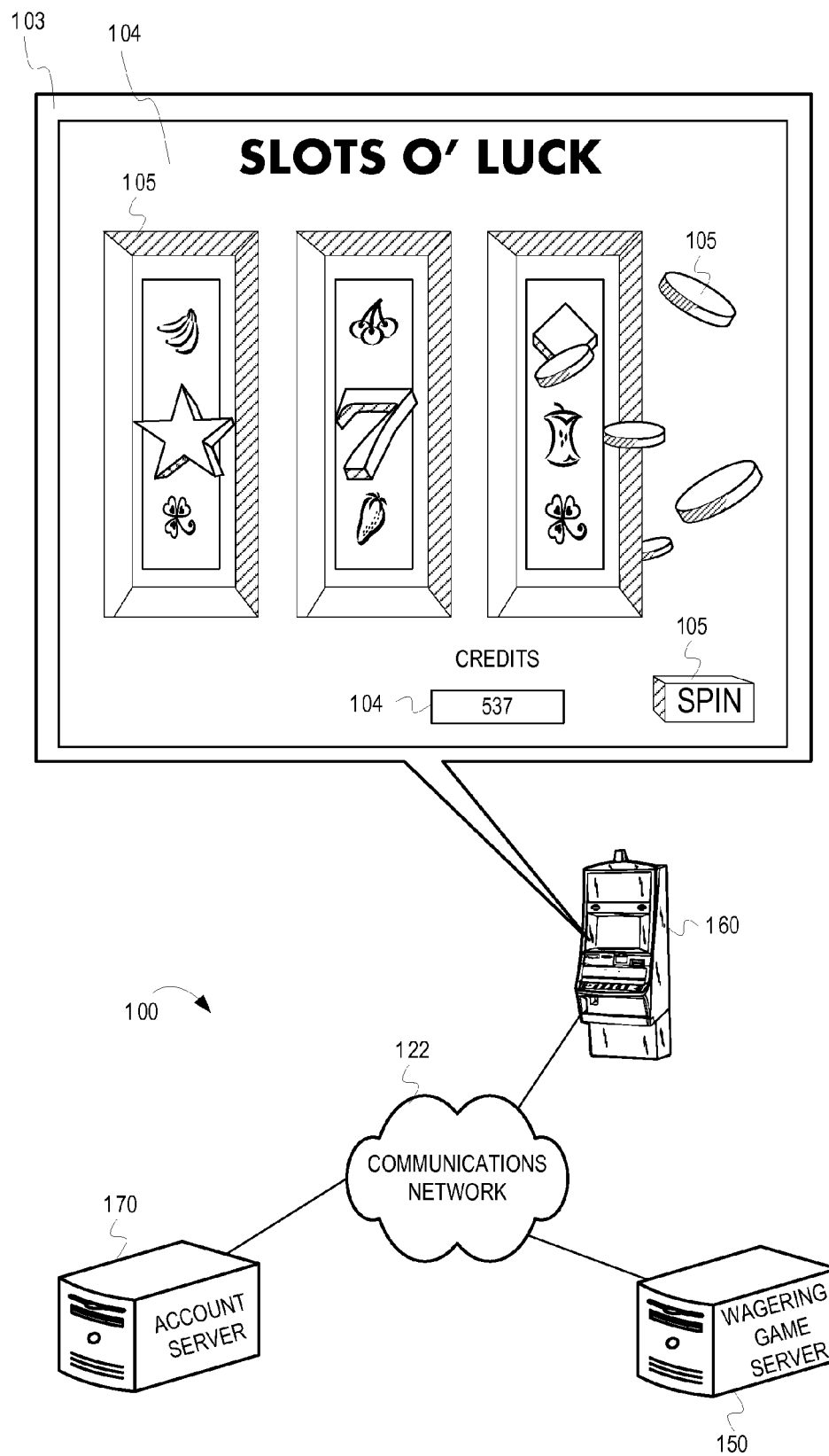
FIG. 1 is a conceptual diagram that illustrates concurrently presenting 3D regions and two-dimensional (2D) regions according to some embodiments.

FIG. 1 is a conceptual diagram that illustrates concurrently presenting 3D regions and 2D regions according to some embodiments. In FIG. 1, a wagering game system ("system") 100 includes a wagering game machine 160, a wagering game server 150, and an account server 170 connected via a communications network 122. The wagering game machine 160 includes a display 103 that presents one of more wagering games, such as a primary wagering game and a secondary wagering game. A primary wagering game and secondary wagering game are wagering game applications that are controlled by the wagering game machine 160 and/or the wagering game server 150. For example, a primary wagering game may be a wagering game application installed and stored on memory of the wagering game machine. The secondary wagering game may be a server-side application controlled by the wagering game server 150 and the wagering game machine 160 as a thin client via the communications network 122. The wagering game machine 160 may include several controls, such as a spin control, betting controls, controls for setting a number of pay lines, a 3D toggle control to toggle 3D presentations on and off, a 3D scaling factor input such as a dial, slider, or value input and so forth. The display 103 is capable of presenting both 2D and 3D content, such as a 3D enable display, an autostereoscopic display, etc., which are capable of presenting content with an appearance of stereoscopic depth.

In some embodiments, the system 100 can present a portion or portions ("regions") 105 of the display 103 in 3D while, simultaneously, presenting a portion or portions ("regions") 104 in 2D. The regions 105 are separate areas of the display 103 which present stereoscopic 3D depth effects during some, or all, of a duration of a wagering game. The stereoscopic 3D effects highlight special objects and/or gaming events that occur within the wagering game.

The following non-exhaustive list illustrates a few examples and features of the regions 105 and regions 104 according to some embodiments:

Example conditions or factors for presentation of regions 105. In some embodiments the regions 105 are presented in 3D based on certain conditions or factors such as, but not limited to, the following:
 a player's playing activity or status,
 denomination values for the wagering game,
 recent bet values or maximum bet play,
 group activity,
 progress in an episodic or persistent-state wagering game,
 time or date,
 degree of gaming activity that has occurred recently in a casino,
 eligibility for bonus games, progressives, etc.,
 locality of the objects within a display,
 relative degrees of significance of playing elements (e.g., based on degrees of significance of payout levels of a pay table),
 user input, or
 any other conceivable condition or factor.

Figure 2A:
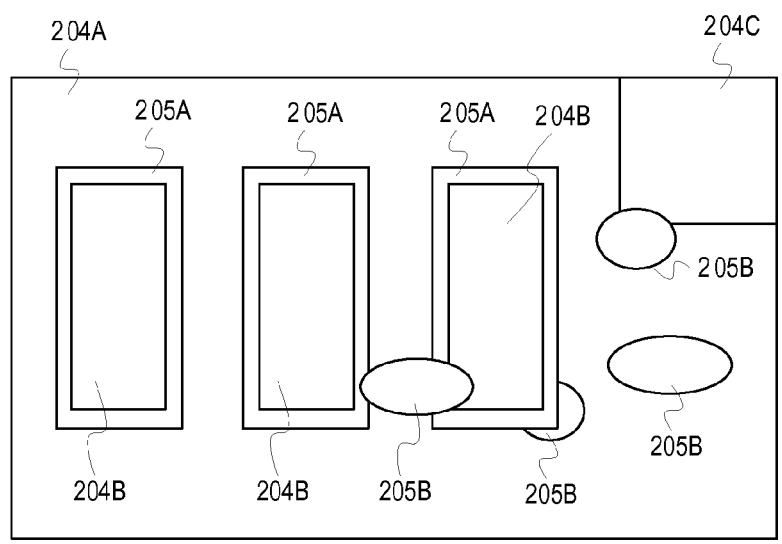
FIGS. 2A-2C are illustrations of concurrently presenting 3D regions and 2D regions, according to some embodiments.

Example presentation mechanics and orientations of regions 105. In some embodiments, the regions 105 are primarily fixed in relation to each other and/or in relation to the regions 104 (e.g., fixed 3D slot reels against a 2D background). In some embodiments the regions 105 enclose or surround 2D areas. For example, in FIG. 2A, regions 205A are set against regions 204A, which is a 2D background. The regions 205A are 3D bezels or frames that surround regions 204B, which contain 2D content. Referring back to FIG. 1, in some embodiments, the regions 105 move around on the display 103 in relation to each other and/or in relation to the regions 104 (e.g., regions 105 move in front of, or behind other objects). For example, in FIG. 2A, regions 205B contain 3D content, such as cascading 3D coins that cascade over regions 204 A and regions 204C, which are 2D backgrounds for a primary and secondary wagering game. Regions 205B also cascade over regions 205A. Referring again to FIG. 1, in some embodiments, the regions 105 remain constantly 3D throughout presentation of a wagering game. In some embodiments, the regions 105 transition back into 2D mode when a 3D object disappears or when an event ends. In some embodiments, the system 100 can detect when a moving 2D object enters the regions 105 (e.g., from the regions 104, from a peripheral display, etc.) and instantly change the appearance of the 2D to have 3D stereoscopic depth.

Numbers of regions 105. Further, in some embodiments, a number of the regions 105 correspond to a number of active gaming elements, such as one region for every slot reel of a wagering game. In some embodiments, the number of the regions 105 varies throughout a wagering game session.

Figure 2B:
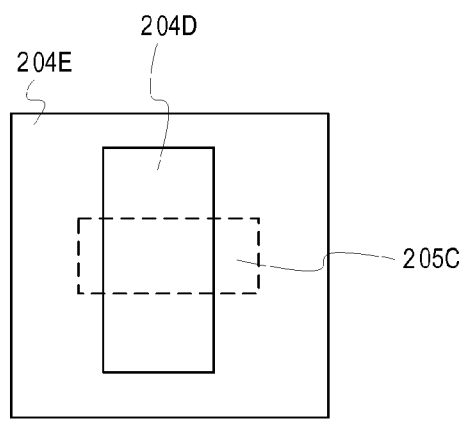
Figure 2C:
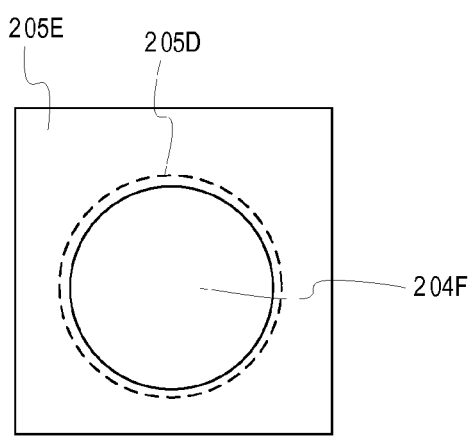

Example uses of regions 105 and/or regions 104 as highlight effects. In some embodiments, the regions 105 transition instantly into 3D modes to highlight specific objects during a given event, such as to highlight a celebratory object that appears during a win event of the wagering game, to highlight a specific character or achievement in a game, to highlight a game feature, etc. If a wagering game is primarily 2D, then the system 100 can suddenly cause a 2D item to change into a 3D item (e.g., to generate an effect where an item appears to pop out of the game, to highlight a feature, button, or control that suddenly becomes active, etc.). For example, in FIG. 2B, a region 204D is primarily in 2D, such as a 2D slot reel against a region 204E, which is either a 2D or 3D background. However, a region 205C, which overlaps the region 204D, causes content of region 204D to suddenly become 3D, such as a reel element that appears to pop out of the screen using a stereoscopic 3D effect. Referring again to FIG. 1, in some embodiments, the system highlights specific events using 2D content. For example, 2D content can have a higher resolution presentation than 3D content. Therefore, a 2D effect can highlight objects for specific events by presenting the objects in higher resolutions. For example, in FIG. 2C, a region 205D, which is in 3D, is positioned against a region 205E, which is a 3D background. The region 205D, for instance, appears as a 3D bubble object. The 3D bubble object pops and suddenly appears as region 204F, which is a 2D object with higher resolution compared to the resolution of the 3D content that was in region 205D or compared to the resolution of the 3D background of region 205E. For instance, the 2D object of region 204F may include high resolution graphics, animations, text, etc. which highlights the content in region 204F in contrast to the relatively lower resolution of the 3D background of region 205E.

Example presentation of regions 105 in response to user input. Referring again to FIG. 1, in some embodiments the system 100 detects when a player drags and drops a 2D object onto another 2D object causing the other object to become 3D. For example, a wagering game presents a 2D token as an achievement in a wagering game. A player drags the 2D token onto a region of a display that presents a 2D pond. When the 2D token is dropped into the 2D pond, the 2D pond suddenly appears to have 3D stereoscopic depth that appears to extend into the display, like the appearance of looking below a surface of 3D pond. Within the 3D pond, 3D fish appear to swim. The 3D fish may be game objects in a bonus wagering game. In some embodiments, the system 100 modifies region of the display 103 to present in 3D mode based on a player's selection of the region (e.g., when a player selects a reel, or other symbol on the display 103, when a player draws a circle around an object on the display 103, when a player touches a given region of the display 103, etc.).

Example modification to degree of 3D stereoscopic depth of regions 105. In some embodiments, the system 100 presents 3D stereoscopic depth that has a variable depth level (e.g., a variable "z" level or variable "z-depth" value), which can vary in degrees relative to a neutral level based on certain conditions or factors, such as any of the condition or factors described previously or any described hereafter. One example condition or factor includes modifying 3D depth according to a hierarchical value of a reel symbol indicated in a pay table (e.g., the system 100 modifies a z-depth value for a slot reel symbol proportional to the symbol's values as listed in the pay table). Another example condition or factor includes modifying 3D depth according to user preferences or user achievements (e.g., an object associated with a user has a higher z-depth value because of the user's preference settings or because of achievements attained by the user within a wagering game).

Further, some embodiments of the inventive subject matter can concurrently present 3D and 2D content via 3D enabled displays associated with a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Generating a Composite Image of 3D and 2D Content

Figure 3A:
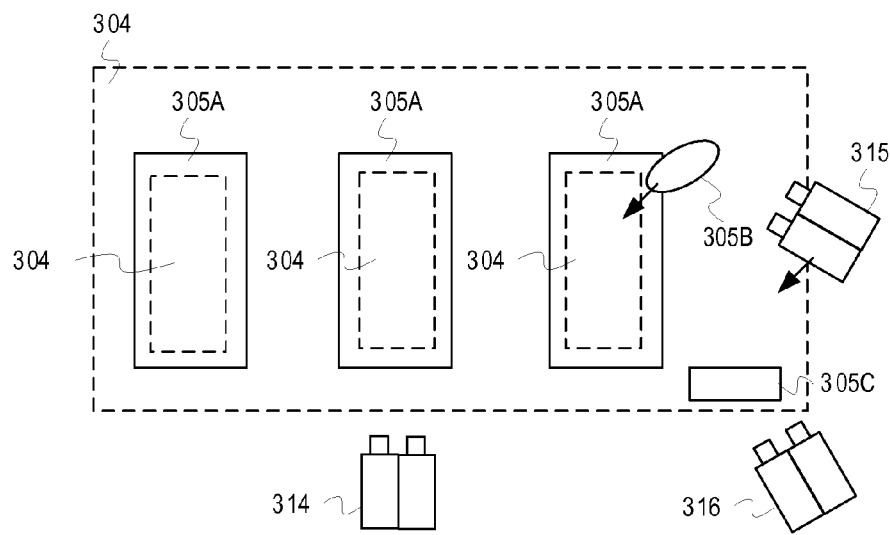
FIGS. 3A-3C are illustrations of generating a composite image of content from 2D regions and 3D regions according to some embodiments.
Figure 3B:
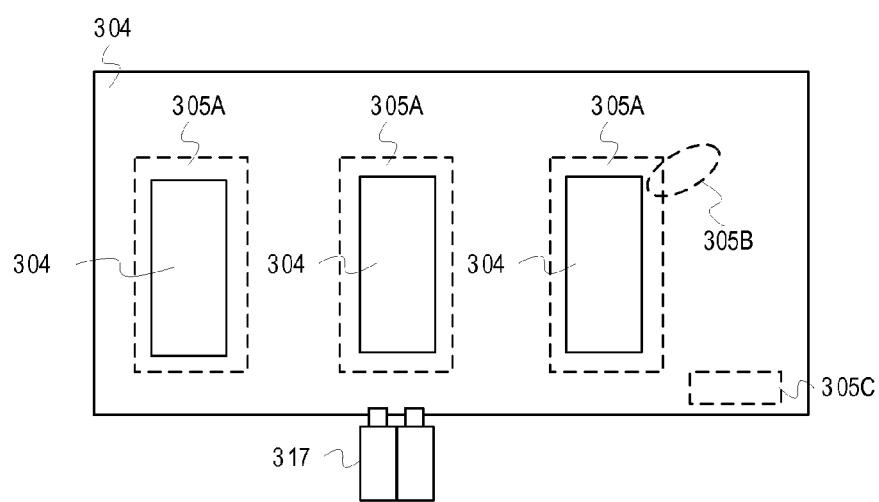
Figure 3C:
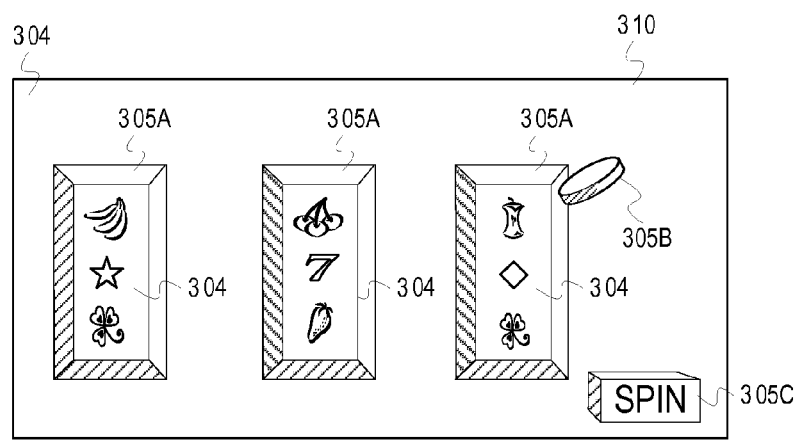

FIGS. 3A-3C illustrate an example of generating a composite image of content from 2D regions and 3D regions according to some embodiments. In FIG. 3A, a wagering game system (e.g., a wagering game machine's graphics unit) creates a virtual 3D game space that includes regions 305A, 305B, 305C and 304. Regions 305A, 305B, and 305C are similar to regions 105 in FIG. 1 and regions 304 are similar to regions 104 described in FIG. 1. In FIG. 3A, a first set of virtual cameras 314 are positioned and oriented to capture images of objects within regions 305A. The virtual cameras 314 behave like real-world cameras, as they may have focal length, depth of field, shutter speed, resolution, aperture size, etc. The virtual cameras 314 can record images at a rate that, upon playback, appears continuous, such as a video camera does. For stereoscopic 3D, two virtual cameras are necessary. A first of the virtual cameras 314 records a first image for presentation to a viewer's left eye, whereas a second of the virtual cameras 314 records a second image for presentation to the viewer's right eye. The regions 305B and 305C, as well as regions 304, are invisible to the virtual cameras 314. The system stores the images of regions 305A in a buffer.

A second set of virtual cameras 315 (similar to virtual cameras 314) are positioned and oriented to capture images of the second region 305B. Regions 305A, 305C and 304 are invisible to the virtual cameras 315. A third set of virtual cameras 316 (similar to virtual cameras 314) are positioned and oriented to capture images of region 305C. Regions 305A, 305B, and 304 are invisible to virtual cameras 316. The system renders the regions 305A, 305B, and 305C as stereoscopic 3D images and buffers the 3D images in one or more graphics buffers. The stereoscopic 3D images in the graphics buffer(s) includes first 2-D images for presentation to a viewer's left eye, and a second 2-D images for presentation to the viewer's right eye. When presented on a stereoscopic 3D display device, the first and second images appear as a stereoscopic 3D image, having an illusion of depth.

In FIG. 3B, a fourth set of virtual cameras 317 (similar to virtual cameras 314) are positioned and oriented to capture images of regions 304. Regions 305A, 305B, and 305C are invisible to virtual cameras 317. The system renders the regions 304 as a 2D image (i.e., without stereoscopic depth) and buffers the 2D image. In some embodiments, only one of the virtual cameras 317 is used to capture 2D content as only one perspective would need to be recorded and presented to a user's eyes to depict a 2D object.

In some embodiments, the virtual cameras (e.g., virtual cameras 314, 315, 316, and 317) are configured to capture images of only objects that are within their respective assigned region (e.g., respectively virtual cameras 314 are assigned to regions 305A, virtual cameras 315 are assigned to region 305B, virtual cameras 316 are assigned to region 305C, and virtual cameras 317 are assigned to regions 304). The objects within coordinates of a given region may include metadata identifiers that are assigned to the region, and the virtual cameras to which the region are assigned are configured to record only the objects whose identifiers are within the coordinates of the region. All other objects that are outside of the region are invisible to virtual cameras assigned to that region. In some embodiments, the virtual cameras are configured to move if their respective regions move. In some embodiments, one or more of the regions 305A, 305B, and 305C may move around and overlap. In such cases, the system can coordinate which of the virtual cameras will record objects within the intersection of the overlapped regions. In some embodiments, the system transfers objects from one region to another (e.g., modifies the metadata identifiers of the objects to be within the region of another of the virtual cameras). In some embodiments, the system can assign more than one set of virtual cameras to any given region, and the system can further divide regions into sub-regions dynamically. In some embodiments, a grid of virtual cameras are assigned to given regions that abut and encompass the entire viewing area of a display. The system can coordinate movement of objects from one region to another, and turn on and off virtual cameras for recording the objects when the objects pass from one region into another.

In FIG. 3C, the system creates a composite image 310. The composite image 310 is comprised of rendered 3D content from regions 305A, 305B, and 305C and rendered 2-D content from regions 304 via a display capable of presenting both 2D and 3D images. In FIGS. 3A-3C, some of the regions 304 are contained within the regions 305A such that 2D content can be surrounded by 3D content. The system can utilize multiple buffers and overlay images within the buffers to generate the composite image 310. For example, the system can include a separate buffer for each set of virtual cameras. The objects contained within the regions assigned to the virtual cameras. Each set of virtual cameras record and store in their respective buffers the images of the objects in their assigned regions according to a common timeline. The system then concurrently overlays each of the buffered images stored in each of the buffers and presents them according to the common timeline.

It should be noted that in some embodiments, like in FIG. 3A-3C, multiple sets of virtual cameras are used concurrently, however in other embodiments only one set of virtual cameras is used at different times and buffered according to separate timelines. The system later synchronizes the timelines and overlays the buffered images according to a synchronized timelines.

Although FIGS. 1, 2A-2B, and 3A-3C describe some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 4:
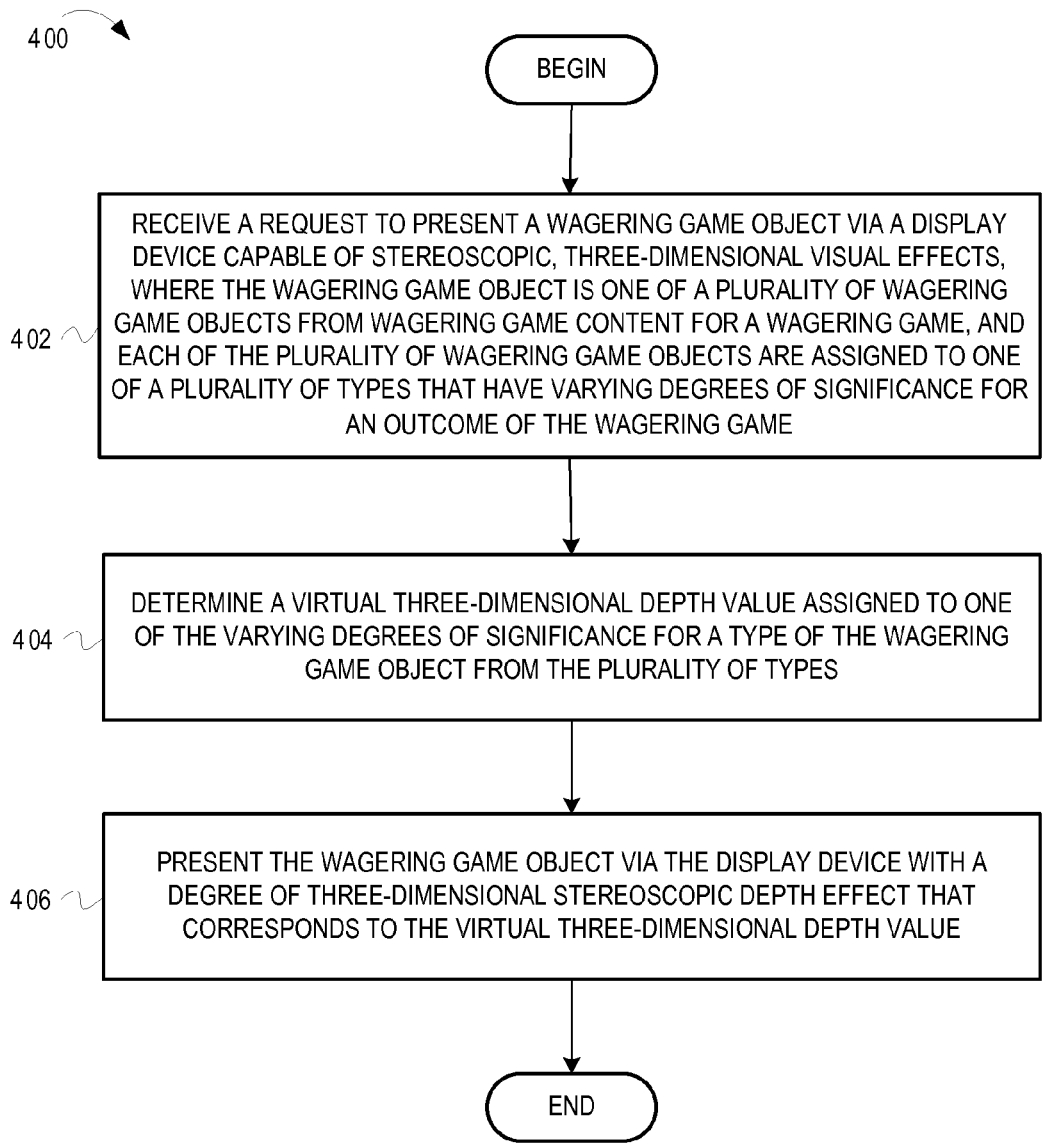
FIG. 4 is a flow diagram 400 illustrating presenting a 3D wagering game object with a degree of stereoscopic depth based on a degree of significance of the wagering game object, according to some embodiments.
Figure 5:
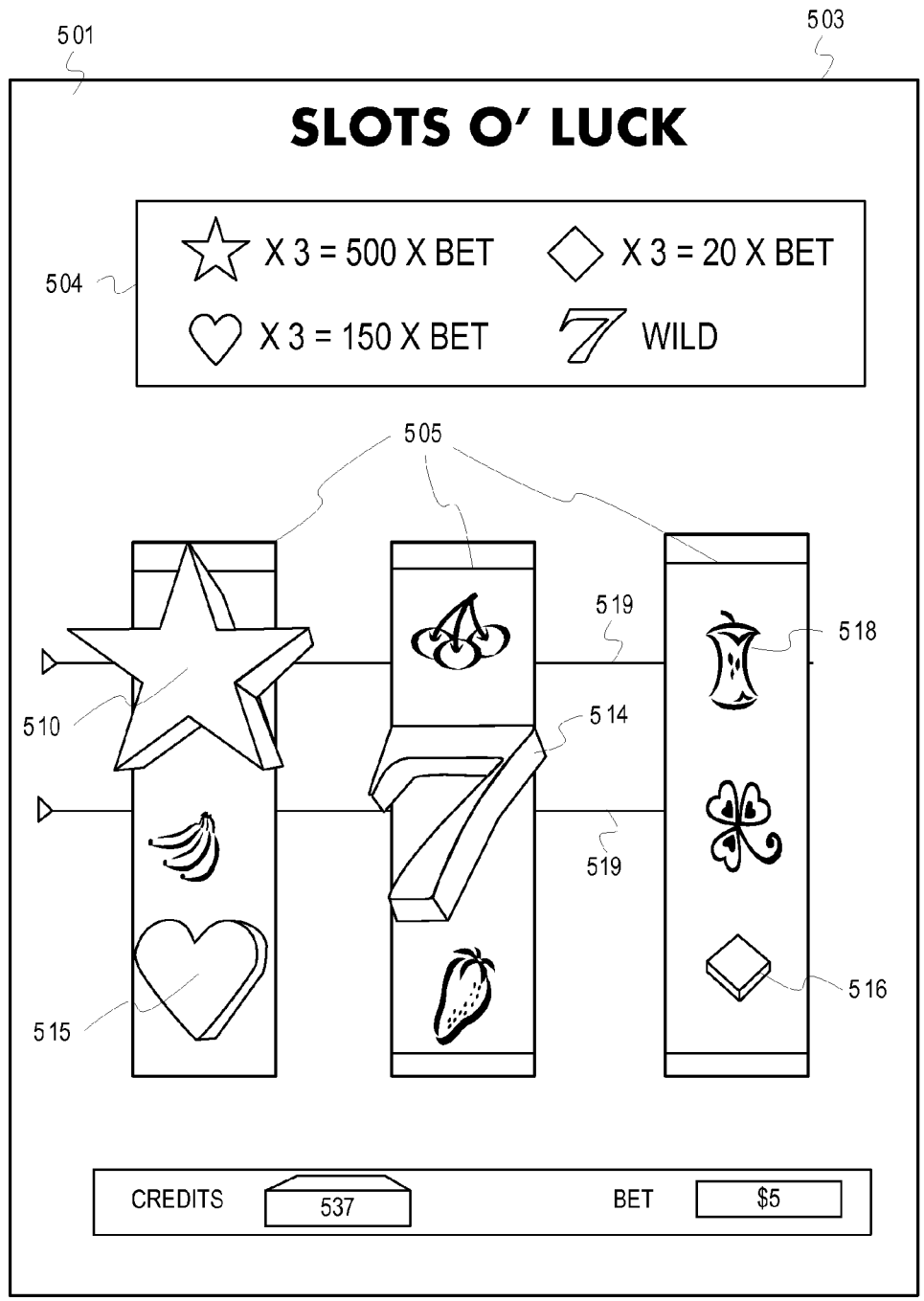
FIG. 5 is an illustration of modifying stereoscopic depth based on a degree of significance of the wagering game object, according to some embodiments.

FIG. 4 is a flow diagram ("flow") 400 illustrating presenting a 3D wagering game object with a degree of stereoscopic depth based on a degree of significance of the wagering game object, according to some embodiments. FIGS. 5-6 are conceptual diagrams that help illustrate the flow of FIG. 4, according to some embodiments. This description will present FIG. 4 in concert with FIGS. 5-6. In FIG. 4, the flow 400 begins at processing block 402, where a wagering game system ("system") receives a request to present a wagering game object via a display device capable of stereoscopic, three-dimensional (3D) visual effects. The wagering game object is one of a plurality of wagering game objects from wagering game content for a wagering game. Each of the plurality of wagering game objects are assigned to one of a plurality of types that have varying degrees of significance for an outcome of the wagering game. For example, in FIG. 5, a wagering game system ("system") presents a wagering game 501 via a display 503 configured for 3D presentation. The wagering game 501 includes wagering game objects on slot reels 505. The wagering game objects include types of symbols (e.g., a star, a shamrock, a strawberry, a group of cherries, an apple core, a heart, a diamond, and an image of the number "7"). Some of the types of symbols are listed within a pay table 504 such as the star, the heart, the diamond, and the number "7" in descending order of significance relative to each other. The star symbol is the most valuable of the different types of symbols (i.e., if three starts appear along one or more potential pay lines 519 in the wagering game 501, then the wagering game 501 awards the highest potential payout according to the pay table 504). The heart symbol is the next most valuable of the different types of symbols (i.e., if three hearts appear along the one or more potential pay lines 519 in the wagering game 501, then the wagering game 501 awards the next highest potential payout according to the pay table 504). The diamond is the next most valuable of the different types of symbol (i.e., if three diamonds appear along the one or more potential pay lines 519 in the wagering game 501, then the wagering game 501 awards the next highest potential payout after those of the star and the heart according to the pay table 504). The "7" is a wild symbol, meaning that it can represent any of the star, heart, or diamond within the one or more potential pay lines 519. Each of the reels 505 is a strip that contains one or more of the types of the symbols.

The flow 400 continues at processing block 404, where the system determines a virtual three-dimensional depth value assigned to one of the varying degrees of significance for a type of the wagering game object from the plurality of types. The flow 400 continues at processing block 406, wherein the system presents the wagering game object via the display device with a degree of three-dimensional stereoscopic depth effect that corresponds to the virtual three-dimensional depth value. For example, in FIG. 5, the system presents symbols 510, 514, and 516 with different degrees of stereoscopic 3D depth values (z-depth). For example, the system causes symbols 510 and 514 to appear to hover above the reels 505 and extend outward from the display 503 toward a viewer (i.e., symbols 510, and 514 have a positive z-depth value). The system also causes symbol 515 to hover above the reels 505, however, not to as much of a degree as the symbols 510 and 514. The system causes symbol 516 to appears to be beneath a surface of the reels 505 than other symbols (i.e., symbol 516 has a negative z-depth value). The degree of the z-depth value can change, in some embodiments, for certain symbols based on various factors, such as relative values of the symbols according to an outcome-determinant hierarchical metric (e.g., according to values for the symbols in the pay table 504), as well as other conditions or factors, such as bet value, player statistics, etc., as described in FIG. 1.

In some embodiments, the system can assign the z-depth values to the symbols using virtual distances from a reference point or plane. For example, in FIG. 6A, the system assigns a virtual radius value to any given symbol presented on the display 503. The virtual radius values represent a distance from a center point 625 of a virtual slot reel wheel. The center point 625 is a reference point from which to compute z-depth values. Each symbol type can have a different virtual radius to the center point 625 of the virtual slot reel wheel. For example, the radius value for the star symbol (R_star) extends from the center point 625 to a virtual distance 622 that is longer than a virtual distance 620 assigned to a default or neutral radius (R_neutral). The neutral radius represents a presentation of a symbol in 2D (e.g., neither having the appearance of extending outward from the display 503 nor having the appearance of extending inward into or beneath the display 503 from the viewer's perspective, thus having a zero value z-depth). In other words, the neutral radius value would not appear to extend outward beyond a surface 621 of the virtual slot reel wheel, nor appear to be underneath the surface 621 of the virtual slot reel wheel. The radius value for the heart value (R_heart) is less than the radius value for the star (R_heart<R_star) because the value for the heart symbol type in the pay table 504 is less than the value for the star symbol type in the pay table 504. The radius value for the diamond (R_diamond) is less than the neutral radius value (i.e., the R_diamond extends from the center point 625 to a virtual distance 624 that is less than the virtual distance 620). However, in other embodiments, the radius value for the diamond is more than the neutral radius value, but less than the radius value for the heart (R_diamond<R_heart) because the value for the diamond symbol type in the pay table 504 is less than the value for the heart symbol type in the pay table 504. The radius value for the "7" symbol (R_wild) depends on which of the currently displayed symbols that are in, or could potentially be in, the one or more potential pay lines 519. For example, referring momentarily back to FIG. 5, the symbol 510 is one of the one or more potential pay lines 519, and, therefore, the symbol 514 has a significance value equal to that of the symbol 510 (both of which are greater than any other symbol). Thus, referring again to FIG. 6A, the R_wild is equivalent to the R_star. The system, therefore, detects which of the radii extend out the furthest and assigns a corresponding (e.g., proportional) z-depth value to any of the relevant symbols presented on the display 503 (e.g., to any of the symbols in any of the potential pay lines 519). The system detects which of the radii is the next least, and assigns a corresponding z-depth value to the relevant symbols, and so forth. According to the radii values assigned to the star, heart, diamond, and wild symbols shown in FIG. 6A, the diamond symbol would appear to either extend inward from, or be beneath, the surface of the virtual slot reel wheel and/or the surface 621 of the display, whereas the star, heart, and the wild "7" symbols would appear to extend outward from, or hover above, the surface 621 of the virtual slot reel wheel.

Figure 6A:
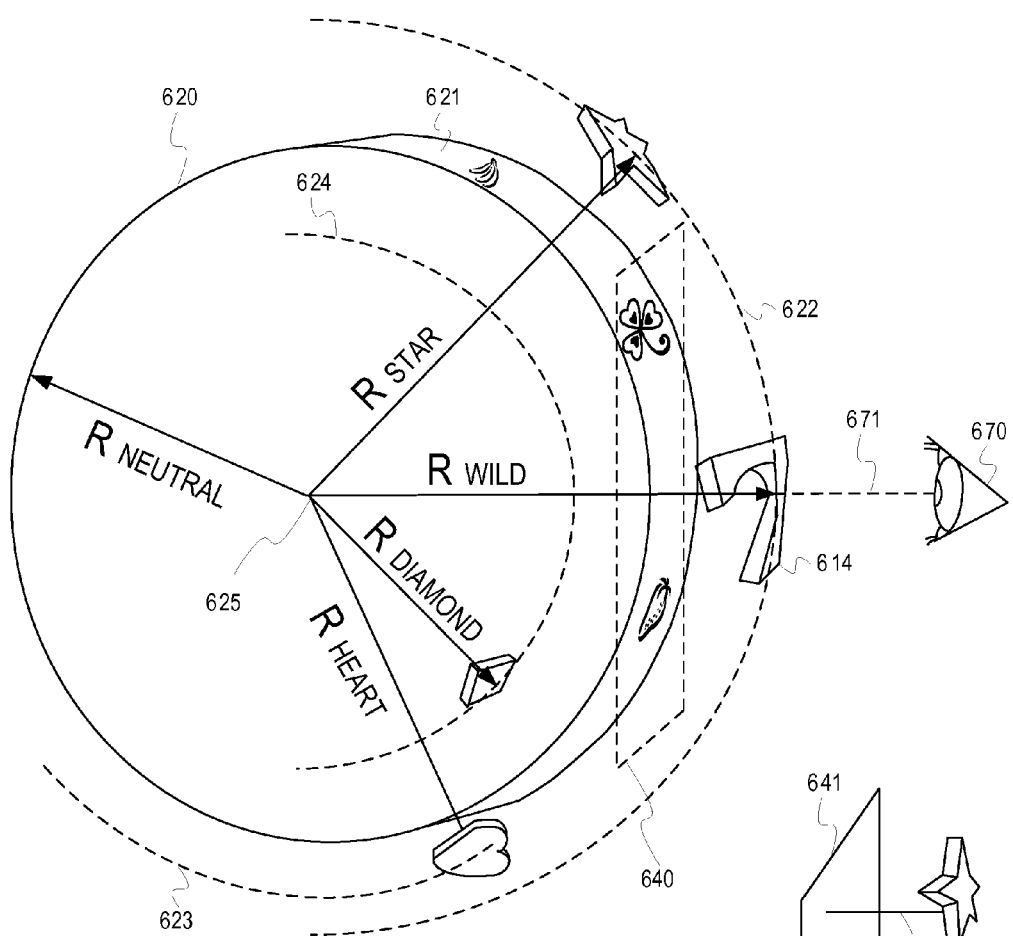
FIGS. 6A-6B are illustrations of modifying stereoscopic depth of wagering game objects based on a degree of significance of the wagering game object according to virtual distances from a reference point, according to some embodiments.
Figure 6B:
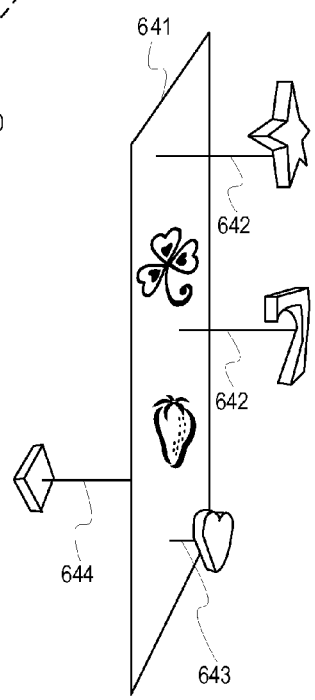

The techniques described in FIG. 6A can be scaled and oriented for use on various types of displays in various combinations of ways. Some embodiments utilize curved displays, whereas other embodiments utilize flat displays, or some combination (e.g., a curved display behind a flat display where the portions of the flat display have transparency so that the curved display can be viewed behind the flat display). For example, in FIG. 6B, the system presents the symbols for the slot reel differently with degrees of stereoscopic depth that correspond to perceived distances 642, 643, and 644 from a surface 641, or neutral plane, of a 3D display. The distances 642, 643, and 644 can correspond to distances 622, 623, and 624 described in FIG. 6A. For example, the system can utilize the techniques described in FIG. 6A to ascertain virtual radii from a center point of a virtual slot reel wheel as a reference point and then scale the radii to the virtual distances 642, 643, and 644 shown in FIG. 6B.

In some embodiments, the system utilizes a surface of a 3D display as a reference plane, and computes virtual distances from that reference plane. For example, in FIG. 6A, 3D objects that are presented via a surface 640 of a 3D display can gradually extend further inward or outward from the surface 640. For example, the techniques described in FIG. 6A presents symbols that appear to gradually increase in stereoscopic depth, which appear to get closer to an observer 670 positioned in front the surface 640 (and/or surface 614 which corresponds, in some embodiments, to the surface 640). As the virtual slot reel wheel moves, a particular symbol (e.g., symbol 614) appears to move toward the observer 670 until the virtual radius for the symbol 614 is substantially aligned with a line of sight 671 of the viewer (i.e., the symbol 614 reaches a virtual apex). After the symbol 614 reaches the virtual apex, the system causes the symbol 614 to appear to gradually decrease in stereoscopic depth, which causes the symbol 614 to appear to get further away from the observer 670 as it approaches the bottom of the virtual slot reel wheel and disappears from view. According to other embodiments, the system presents 3D objects with a constant 3D depth value that remains constant while the 3D objects remain visible (e.g., the system presents first 3D objects at the virtual distance 642 to continuously appear to extend eight inches from the surface 641 while the first 3D objects are visible, the system presents second 3D objects at the virtual distance 643 to continuously appear to extend two inches from the surface 641 while visible, and system presents 3D objects at virtual distance 644 continuously appear be indented into the surface 641 four inches).

Referring again to FIG. 5, it should be noted that in other embodiments, the system can present other symbols (e.g., symbol 518) with a degree of z-depth even if the symbols are not in a pay line. In some embodiments, all of the symbols can be presented with varying degrees of 3D depth. For example, the neutral level may represent a first degree of positive or negative z-depth (e.g. a non-zero z-depth), and higher level symbols are assigned z-depth values higher than the neutral value.

Additional Example Embodiments

According to some embodiments, a wagering game system ("system") can provide various example devices, operations, etc., to modify three-dimensional, wagering-game content to perspective. The following non-exhaustive list enumerates some possible embodiments.

Figure 7:
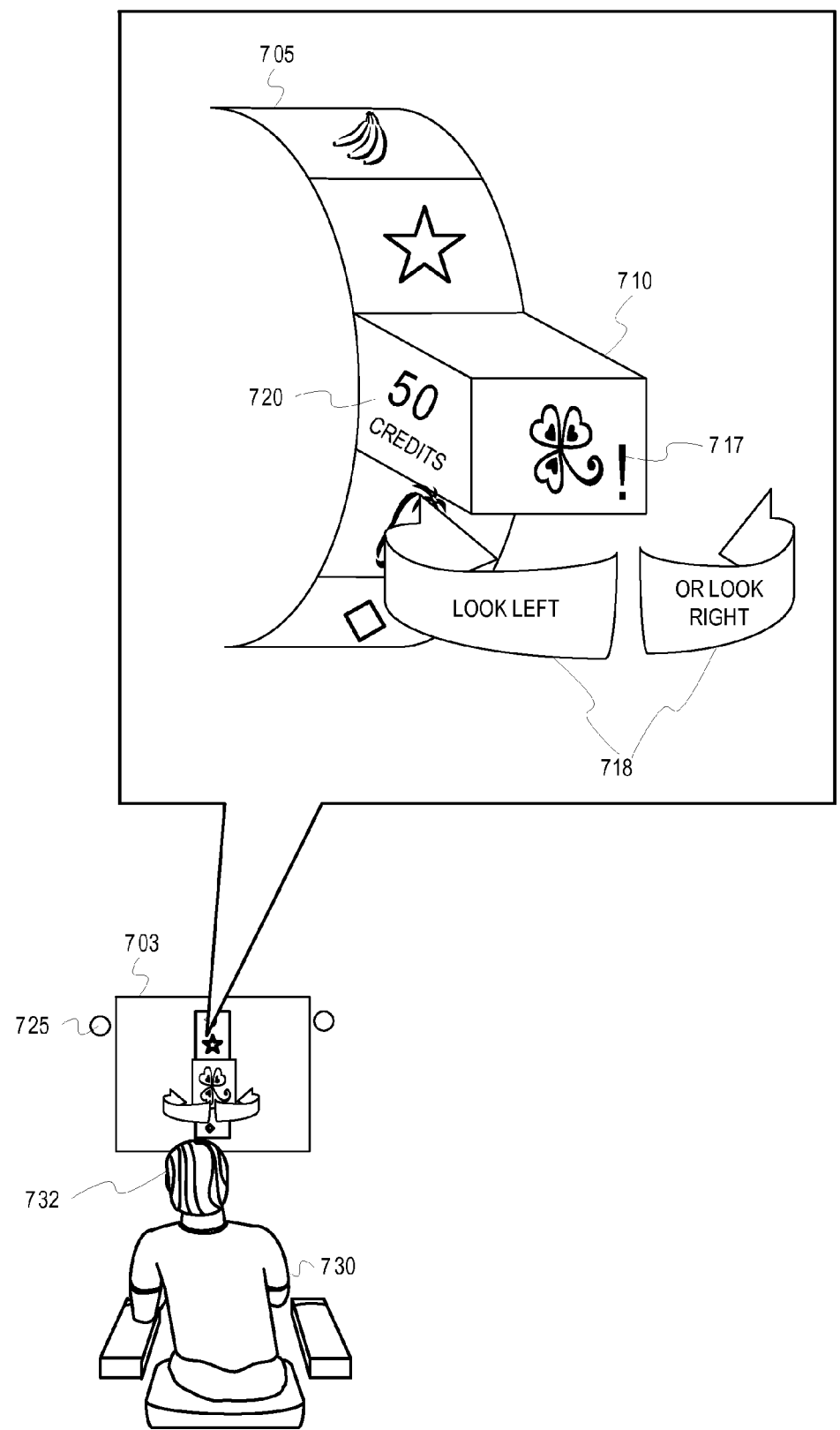
FIG. 7 is an illustration of freezing a view of a 3D wagering game object and presenting a look-around 3D effect, according to some embodiments.

3D look-around freeze. In some embodiments, the system freezes the appearance of a 3D wagering game object so that a viewer can look around a side of the wagering game object. The freeze effect may be initiated by the system on its own or at the player's direction. FIG. 7 is an illustration of freezing a view of a 3D wagering game object and presenting a look-around 3D effect, according to some embodiments. In FIG. 7 an example system includes a 3D display 703 associated with a wagering game machine. Head/face tracking equipment for the wagering game machine includes one or more cameras 725, and/or other sensors, to track the movement of a player 730 (e.g., track movement of the head 732, face or eyes of the player 730). When the player 730 moves left or right, the system tracks the player's movement. The system can utilize information about the movement of the player 730 to cause an appearance of at least a portion of 3D content to appear statically frozen with respect to the viewer as the viewer moves laterally to view new perspectives and discover new content. The system freezes the portion of the 3D content in position in 3D space (e.g., the system does not subtly rotate the image in the same direction as left or right movement of the player 730, limiting them to view the same content, but rather freezes the appearance, which permits the player 730 to view around, or behind the object). In some embodiments, the system generates a subtle counter movement, or counter rotation to the object (e.g., the system can subtly rotate at least the portion of the 3D image in an opposite direction as the left or right movement of the player 730). In some embodiments, the system uses the freezing technique in a wagering game to provide bonus prizes or chances for bonus gaming activity. For example, in FIG. 7, a reel 705 has an element 710 (e.g., a reel symbol) that pops outward from the display 703 using a 3D stereoscopic visual effect. The popped-out element 710 can include a visual indicator 717, and/or one or more graphics 718 can appear, to indicate to the user to look around either to the left or to the right. The system tracks the movement of the player 730 to determine whether the user looks left or right. A left side 720 of the element 710 could have a different bonus item than a right side of the element 710. For example, when the player looks to the left, the system freezes the view of the element 710 so that the player 730 can view the left side 720 of the element 710 to discover a bonus item (e.g., 50 credits). In some embodiments, the one or more cameras 725 carefully track the eyes of the player 730 and, based on information provided by the cameras 725, the system focuses a 3D view of the left side 720 of the element 710 so that only the player can see the bonus item. Had the player chosen to look around the right side of the object, a different outcome may have been encountered and awarded. Autostereoscopic 3D displays, for instance, include lenses and parallax barriers that can focus certain views toward a viewer (e.g., by directing photons to a player's eyes using the lenses and/or by blocking views of pixels that may be seen from perspectives of any other observers). In some embodiments, the system focuses the view to a very limited range of viewing to match only the perspective of the player 730. In some embodiments, the system may further require a player to touch a previously hidden object to activate the object (e.g., the bonus item on the left side 720 of the element 710 may not show a reward until a player touches a portion of the display 730 associated with the left side 720 of the element 710).

Presentation of 3D content based on distance of viewer to display. In some embodiments, the system adjusts multiple left, right, up and down views on a 3D display, to focus at a specific distance from the 3D display. The system, thus, isolates a presentation of a portion of the 3D content to a coordinate in space in front of the 3D display, which is specific to a player so that only the player can see the portion of the 3D content. In some embodiments, the system presents other views focused at other points in space to the left, right, or behind areas of where player is situated. Thus, the system can present other content to other viewers, via the 3D display, which is different from the content that the player sees.

Layered 3D presentation. In some embodiments, the system presents a layered effect that adjusts based on player input. For example, the system presents multiple layers of 3D content that a player must swipe away, or dig into via player input, such as moving a finger across a screen or making certain movements (e.g., a clawing motion).

Additional embodiments regarding 3D depth. In some embodiments, the system modifies the scale of a 3D depth effect (e.g., adjusts a z-depth value) based on an event, such as a user's manual adjustment (e.g., via button, slider, dial, finger motion or position, etc.) or a degree of relevance of a type of game event (e.g., content associated with big win events can have a larger scale of 3D depth). In some embodiments, the system adjusts a parallax (sweet spot) based on user input (e.g., via slider, dial, etc.). In some embodiments, the system presents a mirage effect on a 3D display (e.g., in an attract mode) that comes into focus as a casino patron walks closer to the 3D display (e.g., using head tracking to optimize distal position beyond a position of a wagering game machine's seat). The system can optimize the presentation of the 3D content for the patron by continuously adjusting the parallax as a patron walks toward the 3D display and sits down in front of the wagering game machine. In other embodiments, the system optimizes presentation of 3D content on a topbox display for patrons who are viewing content further from the wagering game machine.

Dynamic adjustment of presentation of 3D content based on a position of a player's hand in relation to the 3D content. In some embodiments, the system detects a position of a player's finger as the user reaches toward a 3D display. The system predicts which object the player is trying to touch and adjusts the position of a 3D object to aid the player, so that the player touches the intended object. In some embodiments, instead of, or in addition to, moving the position of the 3D object, the system present a target image that helps guide the user's finger toward a corresponding coordinate for the object on the 3D display. In some embodiments, the system causes the 3D depth effect to increase to give the user an impression that they are coming in faster than they really are so that the player will slow down their finger's approach to protect the user from stubbing their finger into the screen or a screen from being jabbed. In some embodiments, the system can provide ultrasonics, air puffs, or electromagnetic impressions to interact with the player's finger in space before the player touches the 3D display to give a tactile impression that the player has interacted with the 3D display before the player actually touches a surface of the 3D display.

Example Operating Environments

This section describes example operating environments, such as architectures, systems, networks, etc. and presents structural aspects of some embodiments.

Wagering Game System Architecture

Figure 8:
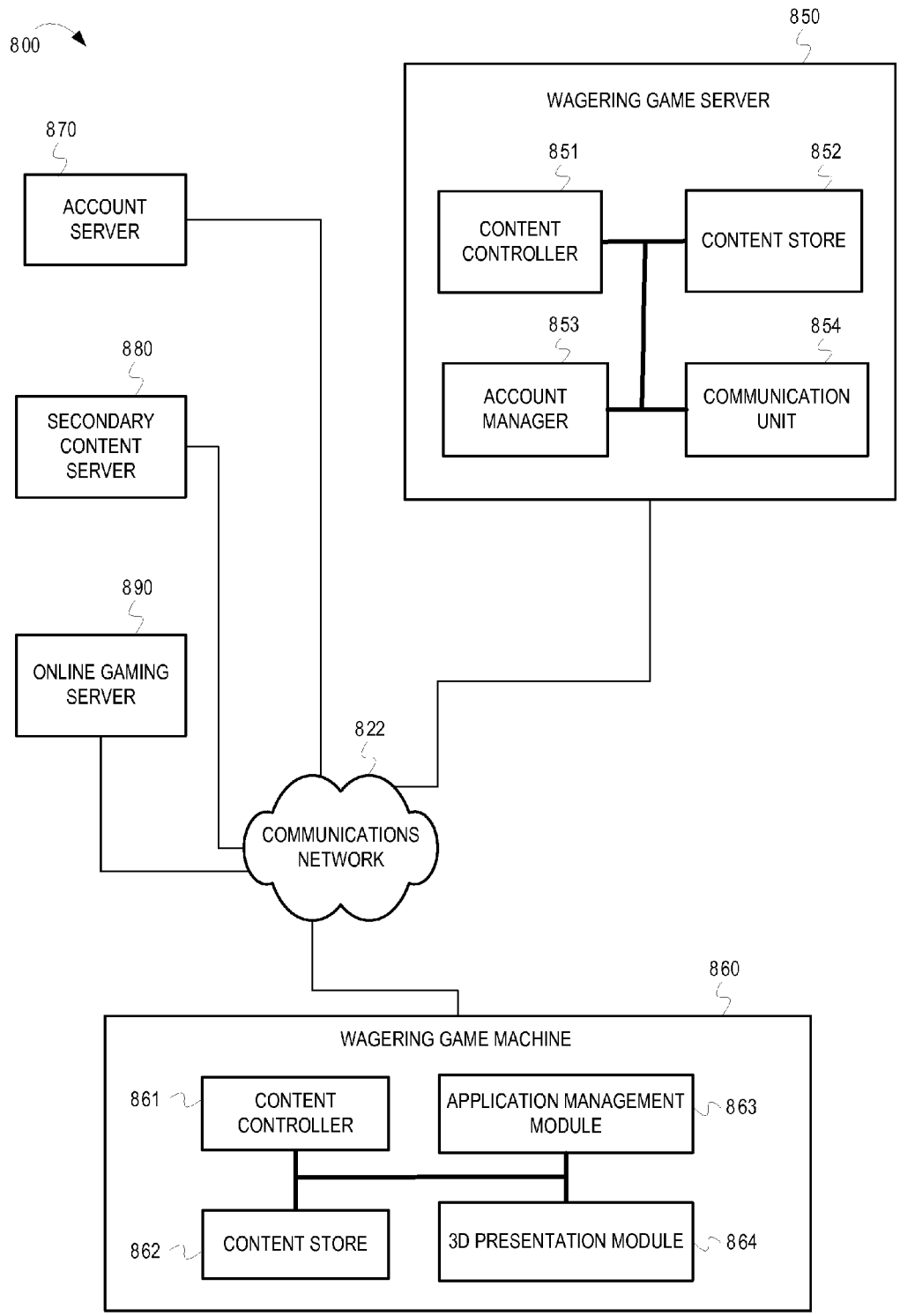
FIG. 8 is an illustration of a wagering game system architecture 800, according to some embodiments.

FIG. 8 is a conceptual diagram that illustrates an example of a wagering game system architecture 800, according to some embodiments. The wagering game system architecture 800 can include an account server 870 configured to control user related accounts accessible via wagering game networks and social networking networks. The account server 870 can store wagering game player account information, such as account settings (e.g., settings related to default enablement of 3D modes, settings related to a type of 3D technology to use to present 3D, settings related to parallax, settings related to social contacts, etc.), preferences (e.g., player preferences 3D presentation), player profile data (e.g., name, avatar, screen name, etc.), and other information for a player's account (e.g., financial information, account identification numbers, virtual assets, social contact information, etc.). The account server 870 can contain lists of social contacts referenced by a player account. The account server 870 can also provide auditing capabilities, according to regulatory rules. The account server 870 can also track performance of players, machines, and servers.

The wagering game system architecture 800 can also include a wagering game server 850 configured to control wagering game content, provide random numbers, and communicate wagering game information, account information, and other information to and from the wagering game machine 860. The wagering game server 850 can include a content controller 851 configured to manage and control content for presentation on the wagering game machine 860. For example, the content controller 851 can generate game results (e.g., win/loss values), including win amounts, for games played on the wagering game machine 860. The content controller 851 can communicate the game results to the wagering game machine 860. The content controller 851 can also generate random numbers and provide them to the wagering game machine 860 so that the wagering game machine 860 can generate game results. The wagering game server 850 can also include a content store 852 configured to contain content to present on the wagering game machine 860. The wagering game server 850 can also include an account manager 853 configured to control information related to player accounts. For example, the account manager 853 can communicate wager amounts, game results amounts (e.g., win amounts), bonus game amounts, etc., to the account server 870. The wagering game server 850 can also include a communication unit 854 configured to communicate information to the wagering game machine 860 and to communicate with other systems, devices and networks.

The wagering game system architecture 800 can also include a wagering game machine 860 configured to present wagering games and receive and transmit information to coordinate, present, and control presentation of 3D elements in 2D gaming environments according to some embodiments. The wagering game machine 860 can include a content controller 861 configured to manage and control content and presentation of content on the wagering game machine 860. The wagering game machine 860 can also include a content store 862 configured to contain content to present on the wagering game machine 860. The wagering game machine 860 can also include an application management module 863 configured to manage multiple instances of gaming applications. For example, the application management module 863 can be configured to launch, load, unload and control applications and instances of applications. The application management module 863 can launch different software players (e.g., a Microsoft® Silverlight™ Player, an Adobe® Flash® Player, etc.) and manage, coordinate, and prioritize what the software players do. The application management module 863 can also coordinate instances of the server applications in addition to local copies of applications. The application management module 863 can control window locations on a wagering game screen or display for the multiple gaming applications. In some embodiments, the application management module 863 can manage window locations on multiple displays including displays on devices associated with and/or external to the wagering game machine 860 (e.g., a top display and a bottom display on the wagering game machine 860, a peripheral device connected to the wagering game machine 860, a mobile device connected to the wagering game machine 860, etc.). The application management module 863 can manage priority or precedence of client applications that compete for the same display area. For instance, the application management module 863 can determine each client application's precedence. The precedence may be static (i.e. set only when the client application first launches or connects) or dynamic. The applications may provide precedence values to the application management module 863, which the application management module 863 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 863 of its current presentation state. The applications may provide presentation state values to the application management module 863, which the application management module 863 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 863 can be pre-configurable. The system can provide controls and interfaces for operators to control screen layouts and other presentation features for the configuring the application management module 863. The application management module 863 can communicate with, and/or be a communication mechanism for, a base game stored on a wagering game machine. For example, the application management module 863 can communicate events from the base game such as the base game state, pay line status, bet amount status, etc. The application management module 863 can also provide events that assist and/or restrict the base game, such as providing bet amounts from secondary gaming applications, inhibiting play based on gaming event priority, etc. The application management module 863 can also communicate some (or all) financial information between the base game and other applications including amounts wagered, amounts won, base game outcomes, etc. The application management module 863 can also communicate pay table information such as possible outcomes, bonus frequency, etc.

In some embodiments, the application management module 863 can control different types of applications. For example, the application management module 863 can perform rendering operations for presenting applications of varying platforms, formats, environments, programming languages, etc. For example, the application management module 863 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 863 can include a portable virtual machine capable of generating and executing code for the varying platforms, formats, environments, programming languages, etc. The application management module 863 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 860 can also include a 3D presentation module 864 configured to control concurrent presentation of 3D and 2D gaming objects.

The wagering game system architecture 800 can also include a secondary content server 880 configured to provide content and control information for secondary games and other secondary content available on a wagering game network (e.g., secondary wagering game content, promotions content, advertising content, player tracking content, web content, etc.). The secondary content server 880 can provide "secondary" content, or content for "secondary" games presented on the wagering game machine 860. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 880 can provide and control content for community games, including networked games, social games, competitive games, or any other game that multiple players can participate in at the same time. In some embodiments, the secondary content server 880 can control and present an online website that hosts wagering games. The secondary content server 880 can also be configured to present multiple wagering game applications on the wagering game machine 860 via a wagering game website, or other gaming-type venue accessible via the Internet. The secondary content server 880 can host an online wagering website and/or a social networking website. The secondary content server 880 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 880 can be configured to integrate 3D wagering game elements in 2D gaming environments. In some embodiments, the secondary content server 880 can also host social networking accounts, provide social networking content, control social networking communications, store associated social contacts, etc. The secondary content server 880 can also provide chat functionality for a social networking website, a chat application, or any other social networking communications mechanism. In some embodiments, the secondary content server 880 can utilize player data to determine marketing promotions that may be of interest to a player account. The secondary content server 880 can also analyze player data and generate analytics for players, group players into demographics, integrate with third party marketing services and devices, etc. The secondary content server 880 can also provide player data to third parties that can use the player data for marketing.

The wagering game system architecture 800 can also include an online gaming server 890 configured to control and present an online website that hosts wagering games. The online gaming server 890 can also be configured to present multiple wagering game applications on the wagering game machine 860, on a mobile computing device, on a personal computer, etc. via a wagering game website, or other gaming-type venue accessible via the Internet. The online gaming server 890 can host an online wagering website and/or a social networking website. The online gaming server 890 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.).

Each component shown in the wagering game system architecture 800 is shown as a separate and distinct element connected via a communications network 822. However, some functions performed by one component could be performed by other components. For example, the wagering game server 850 can also be configured to perform functions of the application management module 863, the 3D presentation module 864, the secondary content server 880, the account server 870, the web server 890, and other network elements and/or system devices. Furthermore, the components shown may all be contained in one device, but some, or all, may be included in, or performed by, multiple devices, as in the configurations shown in FIG. 8 or other configurations not shown. For example, the account manager 853 and the communication unit 854 can be included in the wagering game machine 860 instead of, or in addition to, being a part of the wagering game server 850. Further, in some embodiments, the wagering game machine 860 can determine wagering game outcomes, generate random numbers, etc. instead of, or in addition to, the wagering game server 850.

The wagering game machines described herein (e.g., wagering game machine 860) can take any suitable form, such as floor standing models, handheld mobile units, bartop models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 800 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 9:
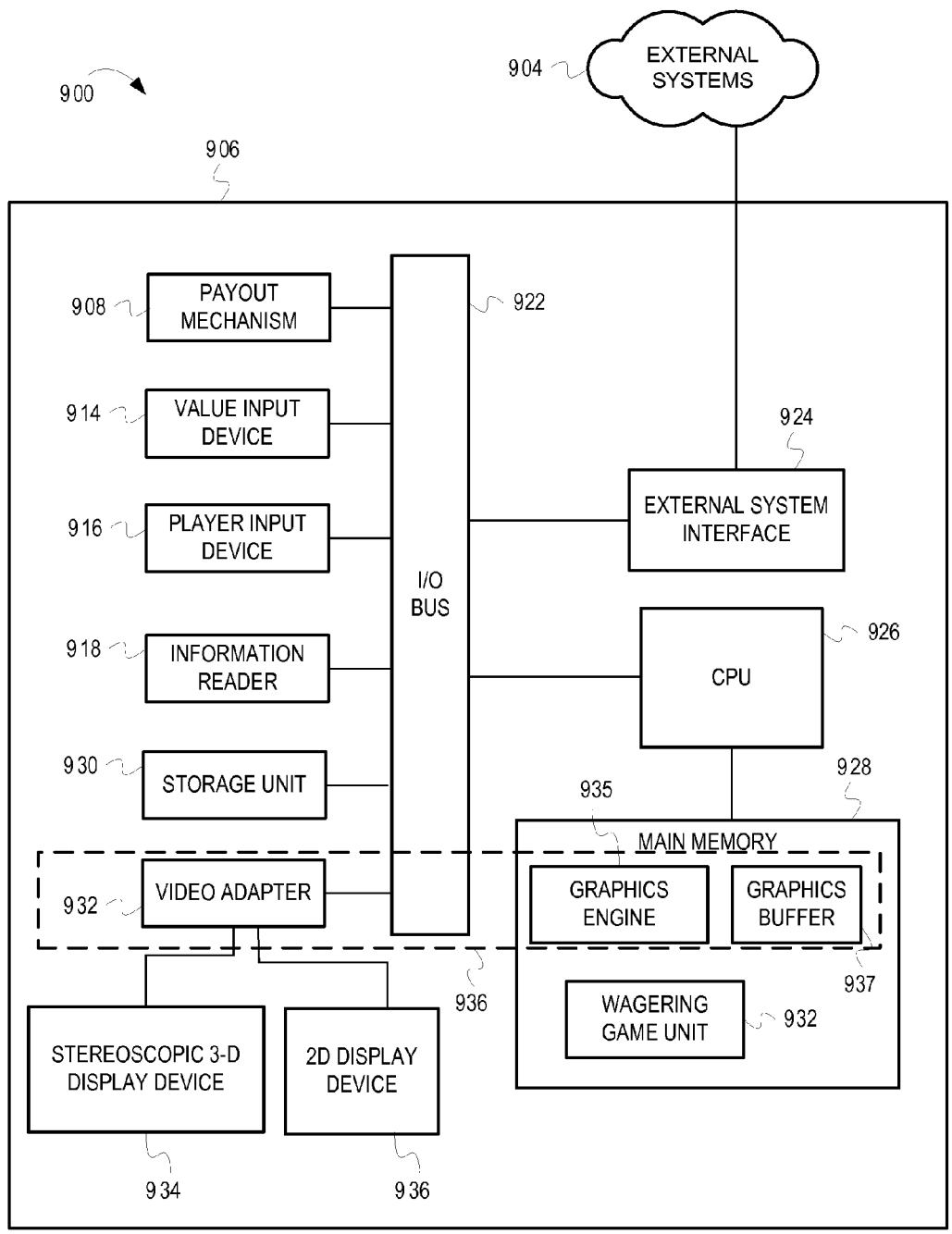
FIG. 9 is an illustration of a wagering game machine architecture 900, according to some embodiments.

FIG. 9 is a block diagram illustrating a wagering game machine architecture, according to example embodiments of the invention. As shown in FIG. 9, the wagering game machine architecture 900 includes a wagering game machine 906, which includes a central processing unit (CPU) 926 connected to main memory 928. The CPU 926 can include one or more processors, such as one or more Intel® Pentium processors, Intel® Core 2 Duo processors, AMD Opteron™ processors, UltraSPARC processors, etc. The main memory 928 includes a wagering game unit 932. In one embodiment, the wagering game unit 932 can present wagering games, such as video poker, video black jack, video slots, video lottery, etc., in whole or part.

The main memory 928 also includes a graphics engine 936 that can use stereoscopic 3D graphics and 2-D graphics to present composite images that include multiple views of a virtual 3D wagering game environment. The graphics engine 935 can operate in concert with a video adapter 932 and graphics buffer 937, which together make up a graphics unit 936. The graphics unit 936 presents composite images on a stereoscopic 3D display device 934. The video adapter 932 is connected to a 2-D display device.

Embodiments of the stereoscopic 3D display device can support any of the following technologies: anaglyph images, polarized projections, autostereoscopic displays, computer-generated holography, volumetric displays, infrared laser projections, side-by-side viewing, autostereograms, pulfrich effects, prismatic & self-masking crossview glasses, lenticular prints, displays with filter arrays, wiggle stereoscopy, active 3D viewers (e.g., liquid crystal shutter glasses, red eye shutterglasses, virtual reality headsets, personal media viewers, etc.), passive 3D viewers (e.g., linearly polarized glasses, circularly polarized glasses, interference filter technology glasses, complementary color anaglyphs, compensating diopter glasses for red-cyan method, ColorCode 3D, ChromaDepth method and glasses, Anachrome "compatible" color anaglyph method, etc.), 3D televisions, etc.

Anaglyph images, for example, are used to provide a stereoscopic 3D effect when viewed with glasses where the two lenses are different (usually chromatically opposite) colors, such as red and cyan. The anaglyph images are made up of two color layers (one for each eye), superimposed, but offset with respect to each other to produce a depth effect when viewed through the glasses. Usually the main subject is in the center, while the foreground and background are shifted laterally in opposite directions. When the two color layers are viewed simultaneously through the anaglyph glasses, an integrated stereoscopic image appears. The visual cortex of the brain fuses the two images into the perception of a three dimensional scene or composition.

In another example, polarized 3D glasses create the illusion of three-dimensional images by restricting the light that reaches each eye, an example of stereoscopy which exploits the polarization of light. To present a stereoscopic video, two images are projected superimposed onto the same screen through different polarizing filters. The viewer wears eyeglasses which also contain a pair of different polarizing filters. Each of the viewer's eyes sees a different image as each filter passes only that light which is similarly polarized and blocks the light polarized in the opposite direction. The use of the polarized 3D glasses thus produces a three-dimensional effect by projecting the same scene into both the viewer's eyes, but depicted from slightly different perspectives. Since no head tracking is involved, several people can view the stereoscopic images at the same time.

In another example, autostereoscopic displays use optical trickery at the display, rather than worn by the user, to ensure that each eye sees the appropriate image. Autostereoscopic displays generally allow the user to move their head a certain amount without destroying the illusion of depth.

In another example, automultiscopic displays include view-dependent pixels with different intensities and colors based on the viewing angle (i.e., a number of different views of the same scene can be seen by moving horizontally around the display). In most automultiscopic displays the change of view is accompanied by the breakdown of the illusion of depth, but some displays exist which can maintain the illusion as the view changes.

In another example, computer-generated holography utilizes devices that create a light field identical to that which would emanate from an original scene, with both horizontal and vertical parallax across a large range of viewing angles.

Volumetric displays are yet another example, where some physical mechanism is used to display points of light within a volume. Such displays use voxels instead of pixels. Volumetric displays include multiplanar displays, which have multiple display planes stacked up, and rotating panel displays, where a rotating panel sweeps out a volume.

Other technologies, for example, may include projecting light dots in the air above a device. An infrared laser is focused on the destination in space, generating a small bubble of plasma which emits visible light.

The CPU 926 is also connected to an input/output (I/O) bus 922, which can include any suitable bus technologies, such as an AGTL+ frontside bus and a PCI backside bus. The I/O bus 922 is connected to a payout mechanism 908, value input device 914, player input device 916, information reader 918, storage unit 930, and the video adapter. The player input device 916 can include the value input device 914 to the extent the player input device 916 is used to place wagers. The I/O bus 922 is also connected to an external system interface 924, which is connected to external systems 904 (e.g., wagering game networks).

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

Furthermore, any component of the wagering game machine 906 can include hardware, firmware, and/or machine-readable storage media including instructions for performing the operations described herein.

Wagering Game Machine

Figure 10:
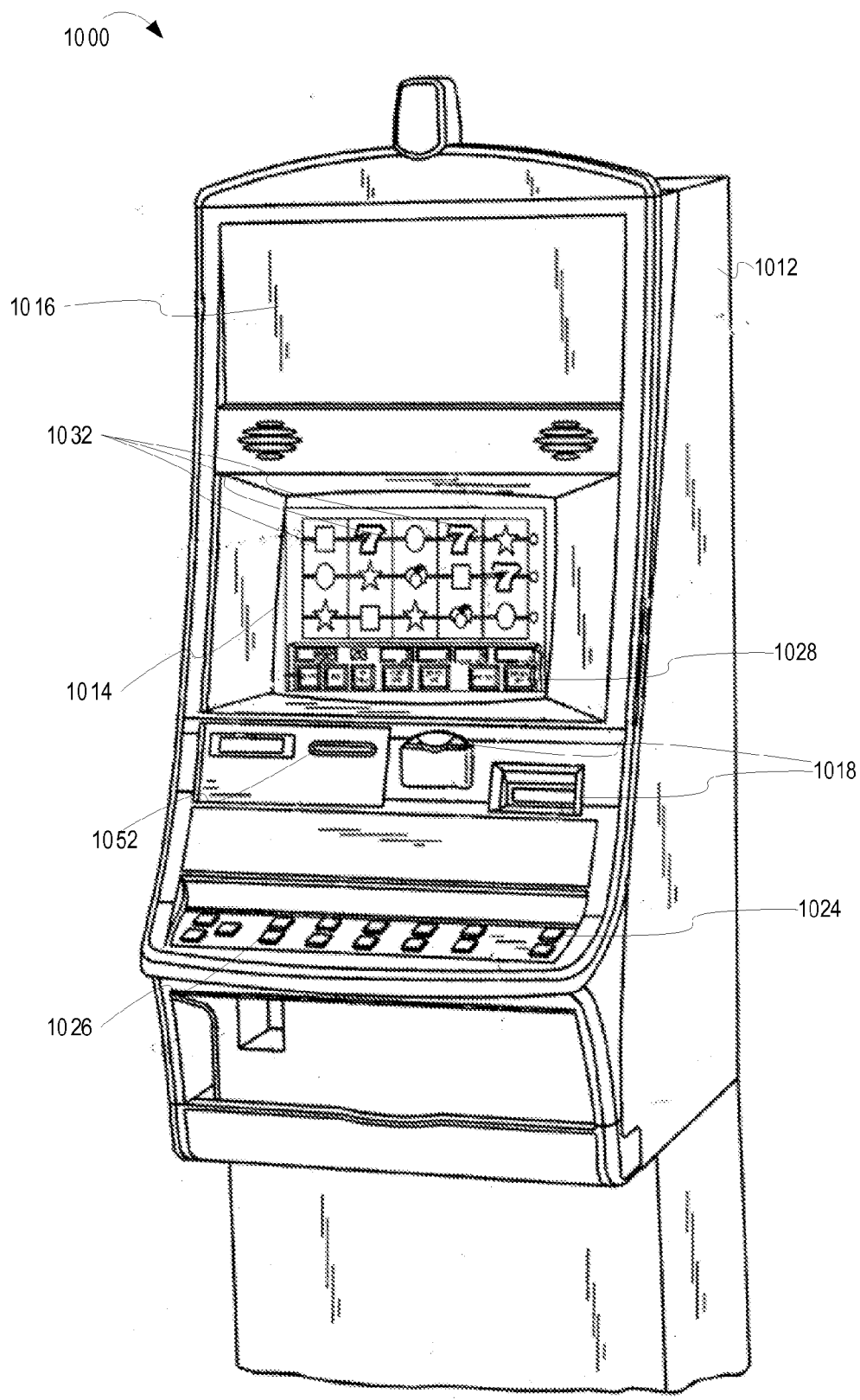
FIG. 10 is an illustration of a wagering game machine 1000, according to some embodiments.

FIG. 10 is a conceptual diagram that illustrates an example of a wagering game machine 1000, according to some embodiments. Referring to FIG. 10, the wagering game machine 1000 can be used in gaming establishments, such as casinos. According to some embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bar top model, mobile handheld model, or workstation console model.

A player begins playing a basic wagering game by making a wager via the value input device 1018. The player can initiate play by using the player input device's buttons or touch screen 1028. The basic game can include arranging a plurality of symbols 1032 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system comprising:
   detecting a request to present different virtual wagering game play symbols via an autostereoscopic display device capable of stereoscopic, three-dimensional visual effects, wherein each distinct symbol from the different virtual wagering game play symbols has a potential payout value that corresponds to each of a plurality of different non-zero, potential payout values specified in a pay table for a wagering game;
   determining, via one or more electronic processing devices of the gaming system, a plurality of different, non-zero, virtual three-dimensional depth values for the different virtual wagering game play symbols, wherein each of the plurality of different, non-zero, virtual three-dimensional depth values corresponds proportionally in three-dimensional stereoscopic depth to each one of the plurality of different non-zero, potential payout values;
   electronically rendering, via one or more graphics processing devices, stereoscopic images to one or more graphics buffers, wherein the stereoscopic images depict the different virtual wagering game play symbols having different, non-zero, levels of three-dimensional stereoscopic depth effect that correspond to the plurality of different, non-zero, virtual three-dimensional depth values; and
   before presentation of a completed winning outcome set of game play symbols for a game play round of the wagering game, presenting, via the one or more electronic processing devices, the stereoscopic images for the different virtual wagering game play symbols via the autostereoscopic display device, wherein the different, non-zero, levels of three-dimensional stereoscopic depth effect depict the plurality of different non-zero, potential payout values that the each of the different virtual wagering game play symbols would pay out if included in the completed winning outcome set of game play symbols.

2. The method of claim 1 further comprising:
   determining virtual radius values associated with each of the different virtual wagering game play symbols, wherein the virtual radius values represent virtual distances from a virtual center of a virtual slot reel wheel, wherein different lengths for the virtual radius values correspond to the plurality of different, non-zero, virtual three-dimensional depth values; and
   depicting, as the virtual slot reel spins, changes to the plurality of different, non-zero, virtual three-dimensional depth values using the virtual radius values.

3. The method of claim 2, wherein each of the plurality of different, non-zero, virtual three-dimensional depth values are greater than or less than a neutral depth value that represents a virtual surface of the virtual slot reel wheel, and wherein the neutral depth value corresponds to a two-dimensional, non-stereoscopic effect.

4. The method of claim 3, wherein any of the plurality of different, non-zero, virtual three-dimensional depth values that are greater than the neutral depth value cause a three-dimensional effect that appears to extend outward from the virtual surface of the virtual slot reel wheel and wherein any of the plurality of different, non-zero, virtual three-dimensional depth values that are less than the neutral depth value cause a three-dimensional effect that appears to be beneath the virtual surface of the virtual slot reel wheel.

5. The method of claim 2, wherein the depicting the changes to the plurality of different, non-zero, virtual three-dimensional depth values cause each of the different virtual wagering game play symbols to change in perspective from an observer viewpoint external to the gaming system as the different virtual wagering game play symbols move toward or away from the observer viewpoint.

6. The method of claim 5, wherein the depicting the changes to the plurality of different non-zero, virtual three-dimensional depth values comprises depicting, using the observer viewpoint as a reference point, each of the different virtual wagering game play symbols at respective ones of the virtual distances from the virtual center of the virtual slot reel wheel as the virtual slot reel wheel moves.

7. The method of claim 1, wherein the presenting comprises presenting the stereoscopic images for the different virtual wagering game play symbols via the autostereoscopic display device during a playing round of the wagering game before a game outcome is revealed for the playing round.

8. The method of claim 7, wherein the detecting the request to present the different virtual wagering game play symbols via the autostereoscopic display device is in response to a user input to place a wager in the wagering game, wherein an amount for the wager is taken from a monetary value obtained via physical money input via a value input device of the gaming system, and
   wherein the presenting the stereoscopic images for the different virtual wagering game play symbols further comprises revealing the game outcome, wherein a winning result for the game outcome causes a payout value redeemable via a value output device of the gaming system.

9. The method of claim 1, wherein the plurality of different, non-zero, virtual three-dimensional depth values are values that depict a stereoscopic depth effect above or below a depiction of a two-dimensional plane on which additional virtual wagering game play symbols are depicted with a two-dimensional visual effect.

10. The method of claim 1, wherein the determining the plurality of different, non-zero, virtual three-dimensional depth values for the different virtual wagering game play symbols comprises setting one of the plurality of different, non-zero, virtual three-dimensional depth values that corresponds to at least one of the different virtual wagering game play symbols to be proportional to one of the different non-zero, potential payout values that corresponds to the at least one of the different virtual wagering game play symbols and to a number of pay lines to which at least one of the different virtual wagering game play symbols is assigned.

11. The method of claim 1, wherein the plurality of different non-zero, potential payout values correspond to values assigned to different types of symbols according to game play rules.

12. The method of claim 1, wherein separate ones of the one or more graphics buffers are associated with separate ones of the plurality of different, non-zero, virtual three-dimensional depth values.

13. The method of claim 1, wherein the determining the plurality of different, non-zero, virtual three-dimensional depth values for the different virtual wagering game play symbols, further comprises determining a value for a game play factor other than a possible pay out value, and setting the plurality of different, non-zero, virtual three-dimensional depth values to be proportional to the different non-zero, potential payout values and to the value for the game play factor.

14. The method of claim 13, wherein the game play factor comprises one or more of a betting history, a betting denomination, a maximum bet value, or a cumulative amount of betting activity that has occurred within a casino for a given time period.

15. The method of claim 13, wherein the game play factor comprises one or more of a player status, a player statistic, a degree of progress in a persistent-state game, a time of day, a date of a year, or an eligibility for a bonus game.

16. One or more non-transitory, machine-readable storage media having instructions stored thereon, which when executed by a set of one or more electronic processing devices of a gaming system cause the gaming system to perform operations comprising:
    detecting a request to present different virtual wagering game play symbols via an autostereoscopic display device capable of stereoscopic, three-dimensional visual effects, wherein each distinct symbol from the different virtual wagering game play symbols has a potential payout value that corresponds to each of a plurality of different non-zero, potential payout values specified in a pay table for a wagering game;
    determining a plurality of different, non-zero, virtual three-dimensional depth values for the different virtual wagering game play symbols, wherein each of the plurality of different, non-zero, virtual three-dimensional depth values corresponds proportionally in three-dimensional stereoscopic depth to each one of the plurality of different non-zero, potential payout values;
    electronically rendering, via one or more graphics processing devices, stereoscopic images to a set of graphics buffers, wherein the stereoscopic images depict the different virtual wagering game play symbols having different, non-zero, levels of three-dimensional stereoscopic depth effect that correspond to the plurality of different, non-zero, virtual three-dimensional depth values; and
    before presentation of a completed winning outcome set of game play symbols for a game play round of the wagering game, presenting the stereoscopic images for the different virtual wagering game play symbols via the autostereoscopic display device, wherein the different, non-zero, levels of three-dimensional stereoscopic depth effect depict the plurality of different non-zero, potential payout values that the each of the different virtual wagering game play symbols would pay out if included in the completed winning outcome set of game play symbols.

17. The one or more non-transitory, machine-readable storage media of claim 16, said operations further comprising:
    determining virtual radius values associated with each of the different virtual wagering game play symbols, wherein the virtual radius values represent virtual distances from a virtual center of a virtual slot reel wheel, wherein different lengths for the virtual radius values correspond to the plurality of different, non-zero, virtual three-dimensional depth values; and
    depicting, as the virtual slot reel spins, changes to the plurality of different, non-zero, virtual three-dimensional depth values using the virtual radius values.

18. The one or more non-transitory, machine-readable storage media of claim 17, wherein each of the plurality of different, non-zero, virtual three-dimensional depth values are greater than or less than a neutral depth value, wherein the neutral depth value corresponds to a two-dimensional, non-stereoscopic effect when presented via the autostereoscopic display device.

19. The one or more non-transitory, machine-readable storage media of claim 18, wherein any of the plurality of different, non-zero, virtual three-dimensional depth values that are greater than the neutral depth value generate three-dimensional effects that appear to extend outward from a surface associated with the virtual slot reel wheel, and wherein any of the plurality of different, non-zero, virtual three-dimensional depth values that are less than the neutral depth value generate three-dimensional effects that appear to be beneath the surface associated with the virtual slot reel wheel.

20. A gaming system comprising:
    at least one input device configured to receive an indication of a wager to play a wagering game;
    an autostereoscopic display device configured to display the wagering game, the autostereoscopic display device being capable of stereoscopic, three-dimensional visual effects;
    at least one electronic processing device;
    one or more graphics processing devices; and
    at least one memory device configured to store instructions that, when executed by the at least one electronic processing device, cause the gaming system to:
        receive a request to present different virtual wagering game play symbols of the wagering game via the autostereoscopic display device, wherein each distinct symbol from the different virtual wagering game play symbols has a potential payout value that corresponds to each of a plurality of different non-zero, potential payout values specified in a pay table for the wagering game;
        determine a plurality of different, non-zero, virtual three-dimensional depth values for the different virtual wagering game play symbols, wherein each of the plurality of different, non-zero, virtual three-dimensional depth values corresponds proportionally in three-dimensional stereoscopic depth to each one of the plurality of different non-zero, potential payout values;
        electronically render, via the one or more graphics processing devices, stereoscopic images to a set of graphics buffers, wherein the stereoscopic images depict the different virtual wagering game play symbols having different, non-zero, levels of three-dimensional stereoscopic depth effect that correspond to the plurality of different, non-zero, virtual three-dimensional depth values; and
        before presentation of a completed winning outcome set of game play symbols for a game play round of the wagering game, present the stereoscopic images for the different virtual wagering game play symbols via the autostereoscopic display device, wherein the different, non-zero, levels of three-dimensional stereoscopic depth effect depict the plurality of different non-zero, potential payout values that the each of the different virtual wagering game play symbols would pay out if included in the completed winning outcome set of game play symbols.

21. The gaming system of claim 20, wherein the plurality of different, non-zero, virtual three-dimensional depth values represent depth relative to a neutral depth value that represents a two-dimensional, non-stereoscopic effect.

22. The gaming system of claim 21, wherein if a first of the plurality of different, non-zero, virtual three-dimensional depth values is greater than the neutral depth value a corresponding first one of the different virtual wagering game play symbols appears to extend in a first direction from the autostereoscopic display device and wherein if a second of the plurality of different, non-zero, virtual three-dimensional depth values is less than the neutral depth value a corresponding second one of virtual wagering game objects appears to extend in a second direction from the autostereoscopic display device that is opposite to the first direction.

23. The gaming system of claim 20, wherein the different virtual wagering game play symbols are a plurality of types of objects, and wherein each of the plurality of types of objects is associated with one of a plurality of different virtual distances from a reference point.

24. A gaming apparatus comprising:
means for receiving a request to present different virtual wagering game play symbols via an autostereoscopic display device capable of stereoscopic, three-dimensional visual effects, wherein the different virtual wagering game play symbols are from wagering game content for a wagering game, wherein each of the different virtual wagering game play symbols has a potential payout value that corresponds to each of a plurality of degrees of non-zero, payout values specified in a pay table for the wagering game;
means for determining a plurality of different, non-zero, virtual three-dimensional depth values, wherein each of the plurality of different, non-zero, virtual three-dimensional depth values corresponds proportionally in three-dimensional stereoscopic depth to each one of the plurality of different non-zero, potential payout values;
means for electronically rendering, via one or more graphics processing devices, stereoscopic images to a set of graphics buffers, wherein the stereoscopic images depict the different virtual wagering game play symbols having different, non-zero, levels of three-dimensional stereoscopic depth effect that correspond to the plurality of different, non-zero, virtual three-dimensional depth values; and
means for, before presentation of a completed winning outcome set of game play symbols for a game play round of the wagering game, presenting the stereoscopic images for the different virtual wagering game play symbols via the autostereoscopic display device, wherein the different, non-zero, levels of three-dimensional stereoscopic depth effect depict the plurality of different non-zero, potential payout values that the each of the different virtual wagering game play symbols would pay out if included in the completed winning outcome set of game play symbols.

25. The gaming apparatus of claim 24 further comprising:
means for determining virtual radius values associated with each of the different virtual wagering game play symbols, wherein the virtual radius values represent virtual distances from a virtual center of a virtual slot reel wheel, wherein different lengths for the virtual radius values correspond to the plurality of different, non-zero, virtual three-dimensional depth values; and
means for depicting, as the virtual slot reel spins, changes to the plurality of different, non-zero, virtual three-dimensional depth values using the virtual radius values.

26. The gaming apparatus of claim 25, wherein the plurality of different, non-zero, virtual three-dimensional depth values are greater than or less than a neutral depth value that represents a virtual surface of the virtual slot reel wheel, wherein the neutral depth value corresponds to a two-dimensional, non-stereoscopic effect, wherein any of the plurality of different, non-zero, virtual three-dimensional depth values that are greater than the neutral depth value cause a three-dimensional effect that appears to extend outward from the virtual surface of the virtual slot reel wheel, and wherein any of the plurality of different, non-zero, virtual three-dimensional depth values that are less than the neutral depth value cause a three-dimensional effect that appears to be beneath the virtual surface of the virtual slot reel wheel.

* * * * *